(12) United States Patent
Hwa

(10) Patent No.: US 8,461,467 B2
(45) Date of Patent: Jun. 11, 2013

(54) LOCAL LIGHTING KEYBOARD

(75) Inventor: Chin-Hsiu Hwa, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 349 days.

(21) Appl. No.: 12/842,712

(22) Filed: Jul. 23, 2010

(65) Prior Publication Data

US 2012/0018289 A1 Jan. 26, 2012

(51) Int. Cl.
*H01H 9/26* (2006.01)
*H01H 13/72* (2006.01)
*H01H 13/76* (2006.01)

(52) U.S. Cl.
USPC .......................................... 200/5 A; 200/314

(58) Field of Classification Search
USPC .......................................... 200/5 A, 310–314
See application file for complete search history.

(56) References Cited

U.S. PATENT DOCUMENTS

| | | | |
|---|---|---|---|
| 6,179,432 B1 | 1/2001 | Zhang et al. | |
| 6,199,996 B1 | 3/2001 | Katrinecz, Jr. et al. | |
| 6,284,988 B1 | 9/2001 | Watanabe et al. | |
| 6,322,229 B1 | 11/2001 | Chan et al. | |
| 6,429,853 B1 * | 8/2002 | Chou | 345/168 |
| 6,554,442 B2 | 4/2003 | Chou | |
| 7,154,059 B2 * | 12/2006 | Chou | 200/314 |
| 8,231,236 B2 * | 7/2012 | Chiang et al. | 362/23 |
| 2008/0314722 A1 * | 12/2008 | Tatehata et al. | 200/314 |

* cited by examiner

*Primary Examiner* — R S Luebke
*Assistant Examiner* — Lheiren Mae Caroc
(74) *Attorney, Agent, or Firm* — Muncy, Geissler, Olds & Lowe, PLLC

(57) ABSTRACT

A local lighting keyboard includes a baseboard, a plurality of keycaps movable up and down against the baseboard, and a circuit board located between the baseboard and the keycaps that is depressible by the keycaps in the up and down movement to output corresponding signals. A mask is provided beneath the keycaps that has a light permeable zone and an impermeable zone, and at least one light source located below a lower surface of the mask. The light source emits light which is transmitted below the mask and passes through the permeable zone to project upwards outside the keyboard. Thus locations of the keycaps are easier to distinguish and keystroke accuracy improves.

6 Claims, 7 Drawing Sheets

LOCAL LIGHTING KEYBOARD

FIELD OF THE INVENTION

The present invention relates to a local lighting keyboard and particularly to a keyboard that provides local lighting to facilitate distinguishing of keycap locations.

BACKGROUND OF THE INVENTION

In the technology information age today computers have been indispensable in people's life. Almost every line of business has to rely on computers to aid operation, either desktop computers or notebook computers. The application scope and use time are extensive. They could be used in any environments. However, in a low luminosity or dark environment, not sufficient light often causes inaccurate keystrokes and results in erroneous signal output. To solve such a problem many types of illuminated keyboards have been developed, such as U.S. Pat. Nos. 6,179,432, 6,199,996, 6,284,988, 6,322,229 and 6,554,442. They all disclose an illuminated keyboard which mainly has a lighting sheet held in the keyboard to illuminate keycaps to facilitate user operation of the keyboard in a light-deficient or dark environment.

However, the aforesaid techniques mostly have an elastic element and a moving mechanism interposed between the lighting element and keycaps. The keycaps, elastic element and moving mechanism are mostly made of light permeable material (some of the techniques have the keycaps made of an opaque material with the character portion on the keycaps made of the light permeable material). When the entire lighting sheet emits light the keyboard is evenly illuminated in a backlit manner. Such an illuminated keyboard generally is used in a light-deficient or dark environment, such as in an airplane, vehicle or the like. But with the entire keyboard emitting light evenly the total luminosity is too strong that could affect people nearby. Moreover, in the lower luminosity environment user's visual capability on the keyboard is lower naturally, with the entire keyboard luminous evenly user is difficult to differentiate the character notation of each keycap. Even through the characters and symbols are made of opaque material, or the keycap is made of impermeable material while the character notation made of permeable material, light emitting from the gaps between the adjacent keycaps still make the user hard to recognize the characters. For a user who does not well memorize location of the characters the situation is particularly serious, and he may thus input wrong instructions.

SUMMARY OF THE INVENTION

An objection of the present invention is to solve the aforesaid problems by providing a local lighting keyboard to facilitate distinguishing of the relevant locations of keys.

To achieve the foregoing objection the present invention provides a local lighting keyboard that includes a keyboard portion and a luminous portion located in the keyboard. The keyboard portion has a baseboard and a plurality of keycaps movable up and down against the baseboard. The baseboard and the keycaps are interposed by a circuit board to output corresponding signals when depressed by the keycaps during up and down movement. The luminous portion has a mask located beneath the keycaps. The mask has a light permeable zone and an impermeable zone, and at least a light source located beneath a lower surface of the mask. The light source emits light which is transmitted below the mask and projects upwards outside the keyboard through the light permeable zone.

By means of the structure set forth above the keyboard can emit light locally to facilitate distinguishing of the locations of the keycaps and improve usability and keystroke accuracy.

The foregoing, as well as additional objections, features and advantages of the present invention will be more readily apparent from the following detailed description, which proceeds with reference to the accompanying drawings.

DETAILED DESCRIPTION OF THE PREFERRED EMBODIMENTS

Figure 1:
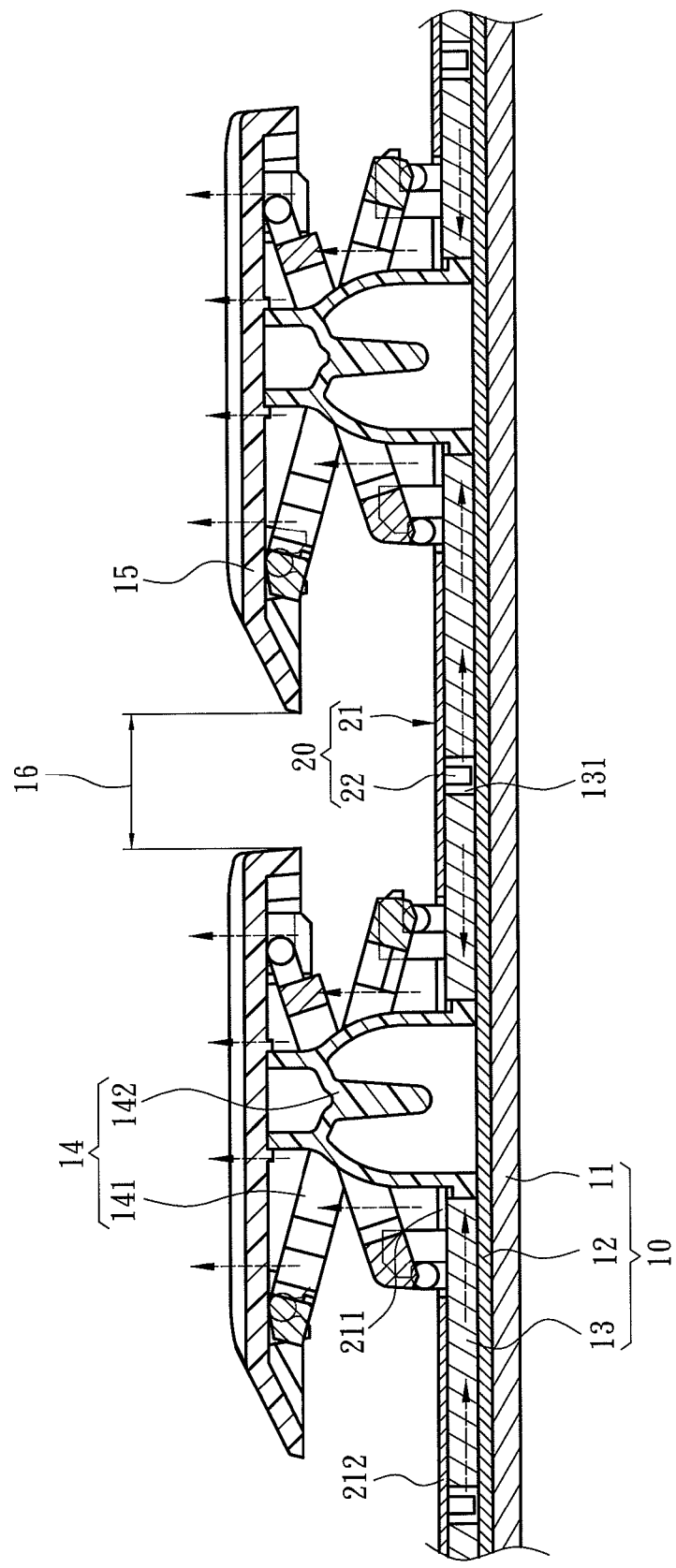
FIG. 1 is a side sectional view of a first embodiment of the present invention.

Please refer to FIG. 1 for a first embodiment of the local lighting keyboard of the present invention. It mainly includes a keyboard portion 10 and a luminous portion 20. The keyboard portion 10 includes, from a lower side to an upward side, a baseboard 11, a circuit board 12 and a plurality of keycaps 15. The circuit board 12 and the keycaps 15 are interposed by a holding board 13. The holding board 13 and the keycaps 15 are bridged by a moving mechanism 14. The moving mechanism 14 includes a movable member 141 bridging the holding board 13 and the keycap 15 and an elastic element 142 supporting the keycap 15 to provide a return force for the keycap 15. The keycap 15 can be stricken and moved up and down through the moving mechanism 14 so that the elastic element 142 connects to the circuit board 12 to output corresponding signals.

The luminous portion 20 has a mask 21 located beneath the keycaps 15. The mask 21 has a light permeable zone 211 and an impermeable zone 212, and at least one light source 22 located below a lower surface of the mask 21, such as a light emitting diode. In the first embodiment shown in FIG. 1, the mask 21 is located between the holding board 13 and the keycap 15. The holding board 13 has a holding cavity 131 to hold the light source 22. The light permeable zone 211 can be an opening below the keycap 15 to hold the elastic element 142. Light emitted from the light source 22 below the mask 21 is conducted by the holding board 13 and projects upwards through the opening of the permeable zone 211 to the keycap 15 outside the keyboard portion 10. On the other hand, the light is constrained by the impermeable zone 212 without transmitting to a gap 16 formed between the keycaps 15. Hence the light emits only through the keycaps 15, but not through the gap 16.

Figure 2:
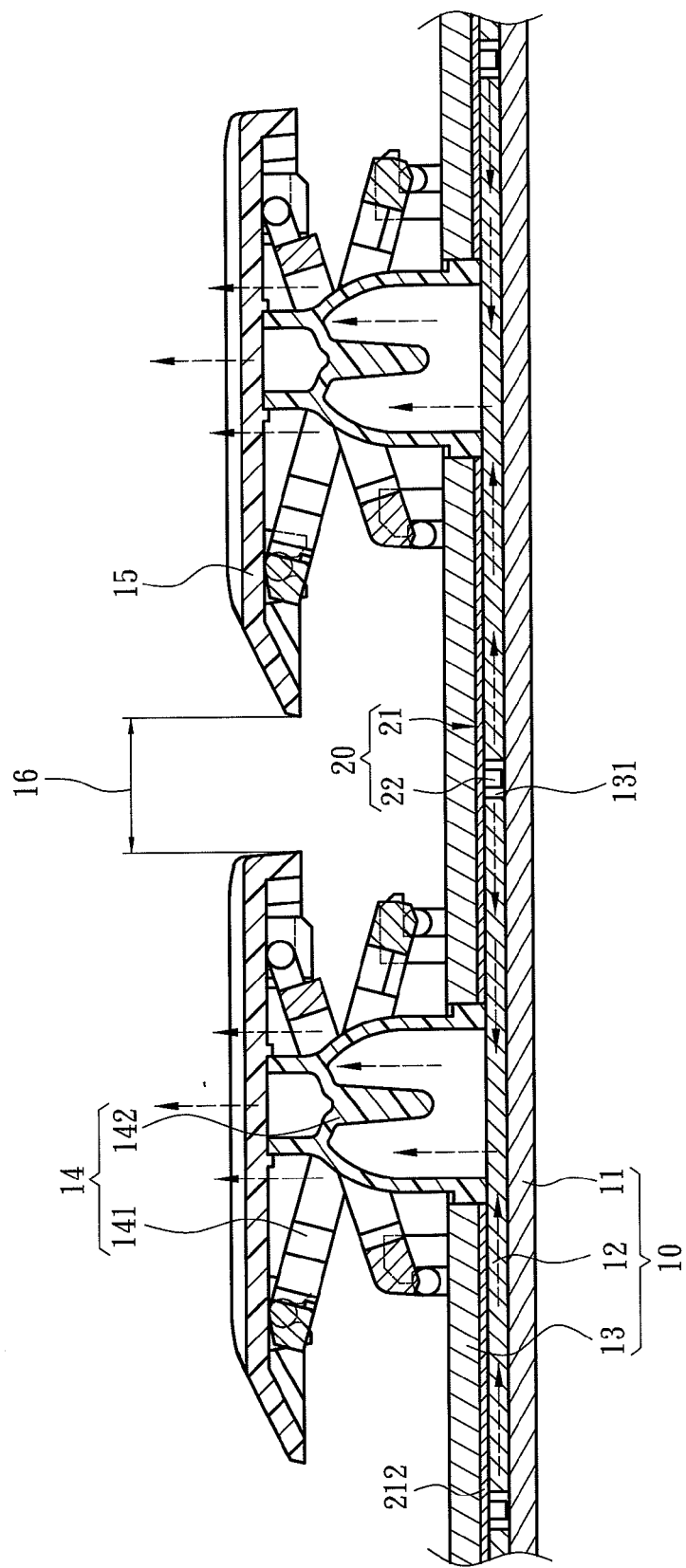
FIG. 2 is a side sectional view of a second embodiment of the present invention.

Refer to FIG. 2 for a second embodiment of the present invention. Compared with the first embodiment, the mask 21 is located on the circuit board 12 between the holding board 13 and the circuit board 12. The circuit board 12 has a holding cavity 121 to hold the light source 22. Similarly, the light emitted from the light source 22 also is transmitted below the mask 21 and projects upwards to the keycaps 15 through the permeable zone 211 so that the keycaps 15 can emit light. Such a local lighting approach makes distinguishing the location of the keycaps 15 easier.

Figure 3:
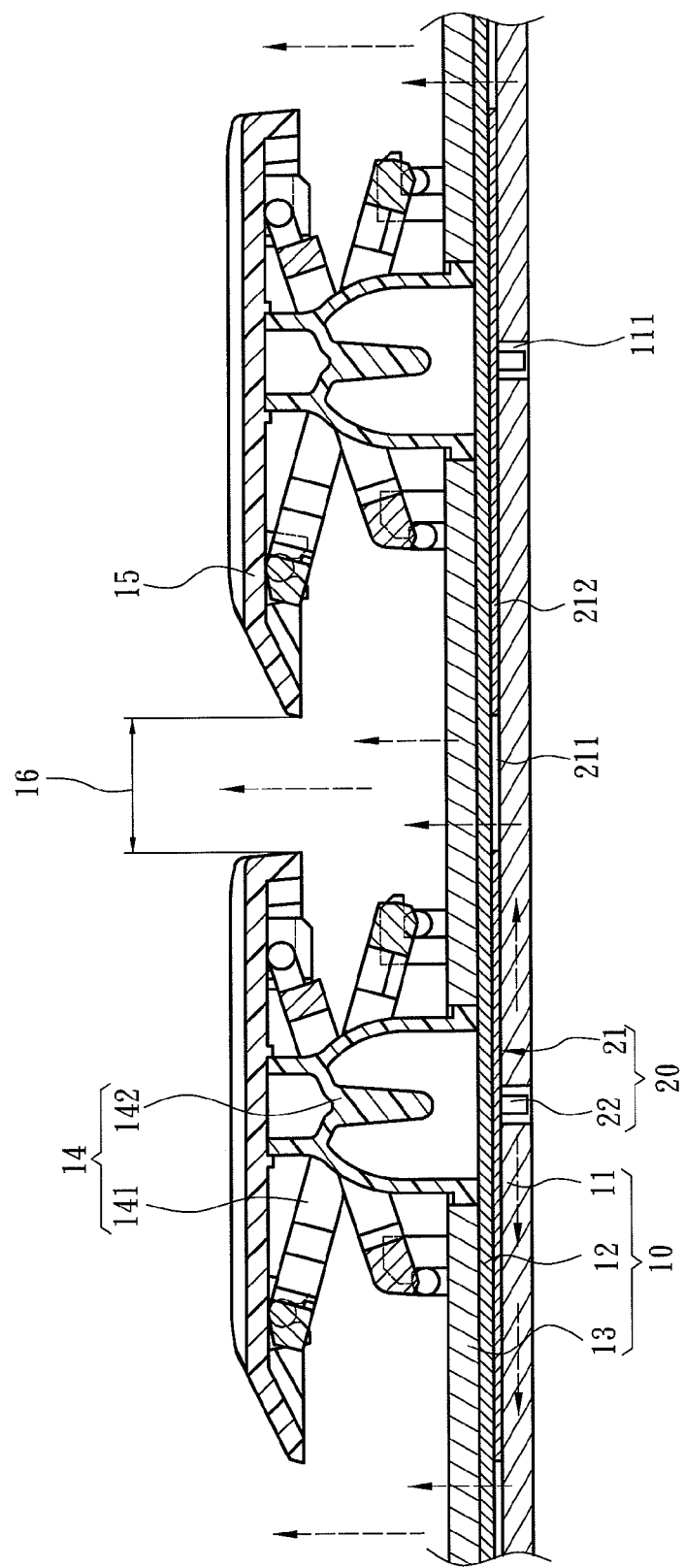
FIG. 3 is a side sectional view of a third embodiment of the present invention.
Figure 4:
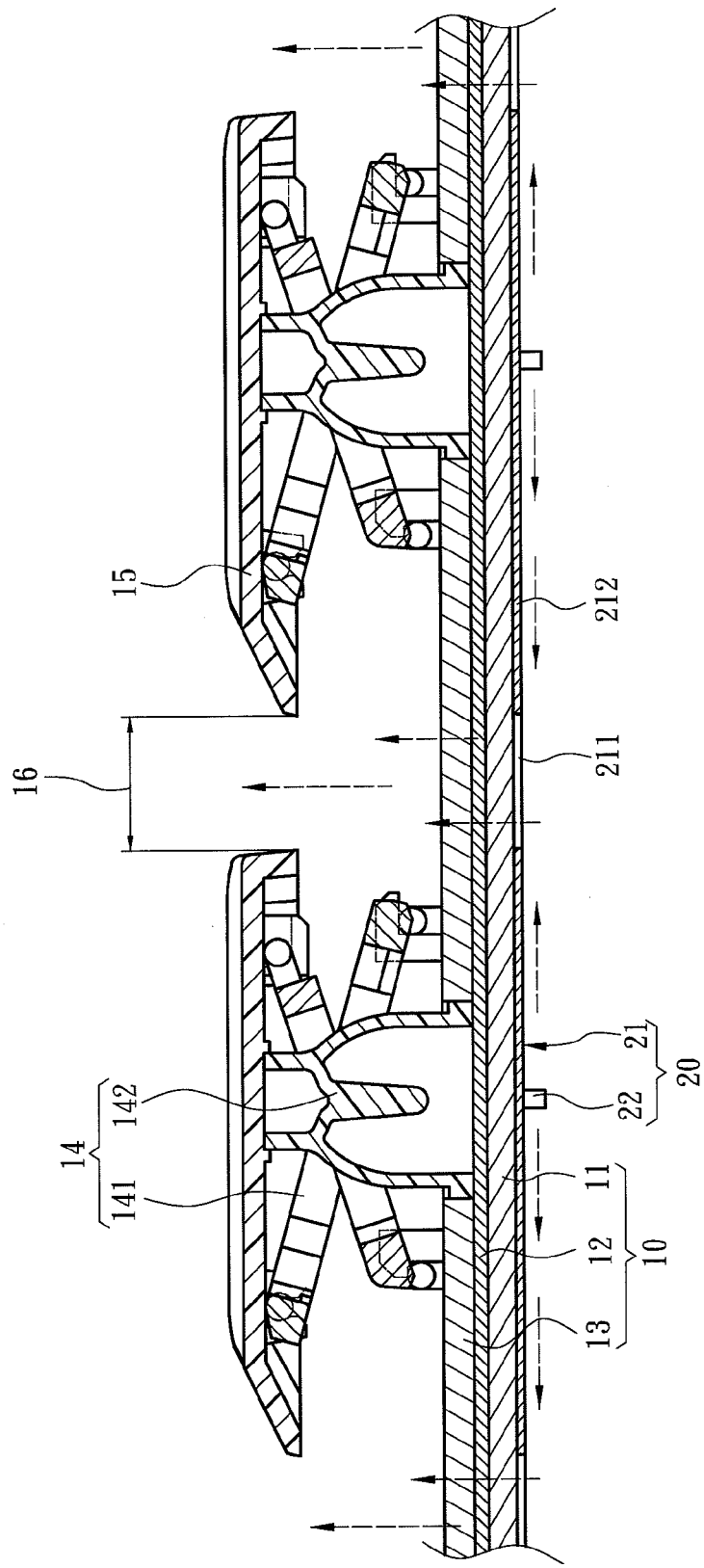
FIG. 4 is a side sectional view of a fourth embodiment of the present invention.

Aside from implementation by lighting the keycaps 15, the present invention can also adopt another approach by lighting the gap 16 between the keycaps 15 to achieve the same result. Refer to FIG. 3 for a third embodiment and FIG. 4 for a fourth embodiment. In FIG. 3, the mask 21 is located between the circuit board 12 and the baseboard 11, and the baseboard 11 has a holding cavity 111 to hold the light source 22. In FIG. 4, the mask 21 is located beneath the baseboard 11. In FIGS. 3 and 4, the permeable zone 211 of the mask 21 is correspondingly located below the gap 16 of the keycaps 15. The permeable zone 211, besides being formed in an opening as previously discussed, can also be a light conductive material. When the light emitted from the light source 22 transmits below the mask 21, it can project upwards to the gap 16 but is blocked by the keycaps 15 so that only the gap 16 emits light while the keycaps 15 do not emit light. Thus the locations of the keycaps 15 can be recognized and differentiated.

Figure 5:
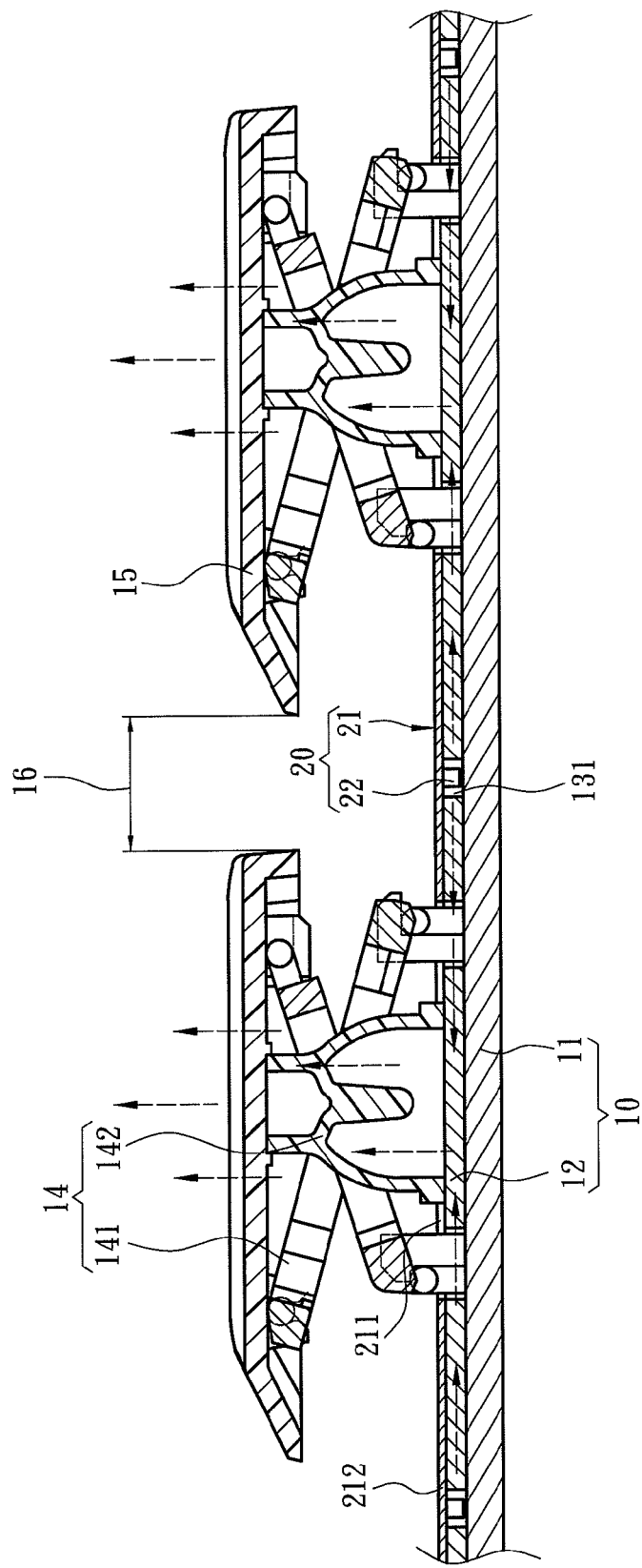
FIG. 5 is a side sectional view of a fifth embodiment of the present invention.
Figure 6:
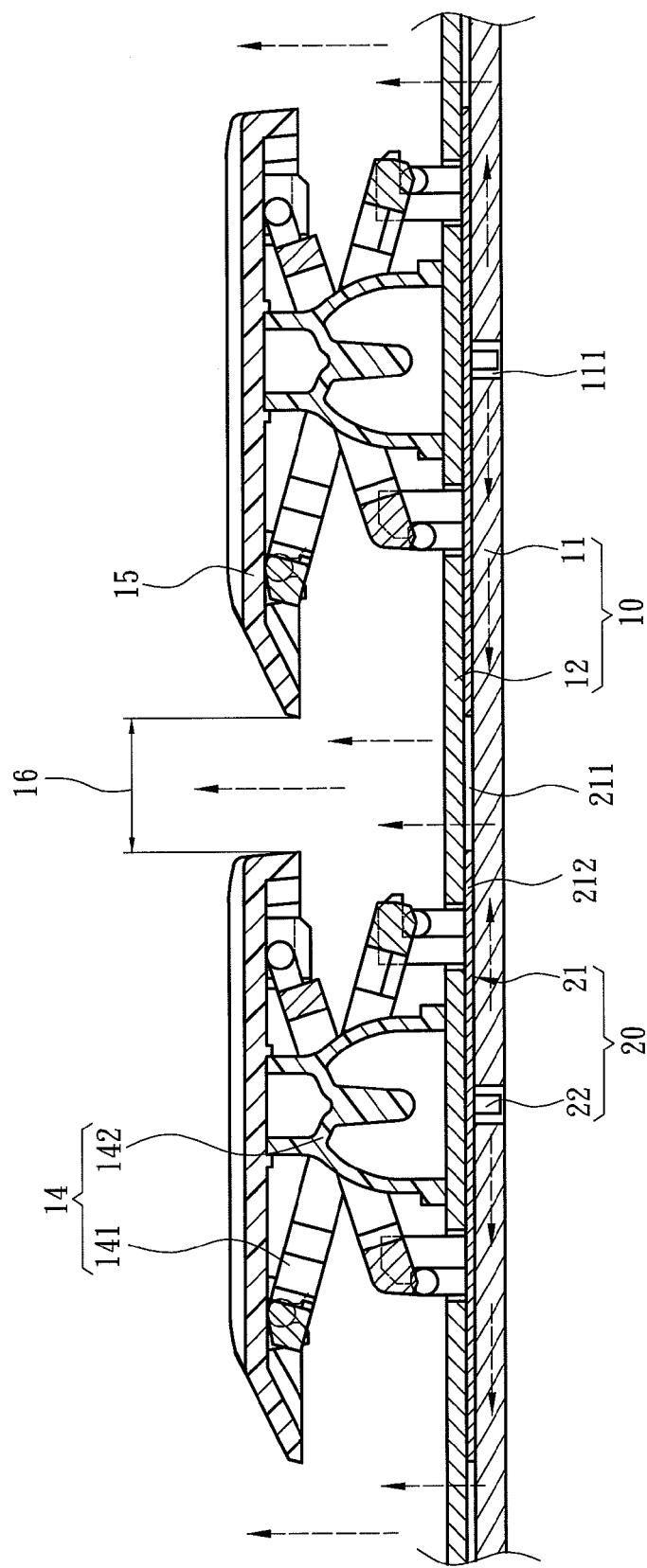
FIG. 6 is a side sectional view of a sixth embodiment of the present invention.
Figure 7:
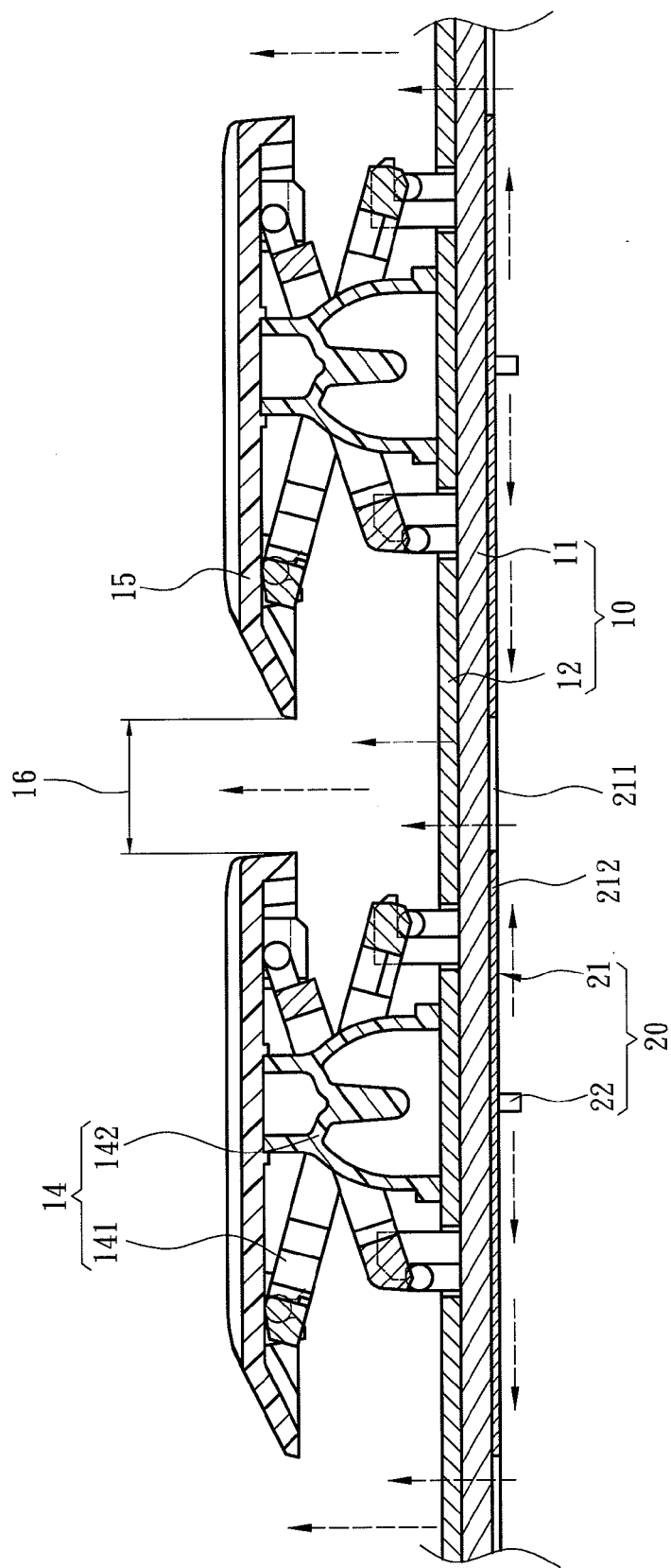
FIG. 7 is a side sectional view of a seventh embodiment of the present invention.

In addition to the aforesaid embodiments, the holding board 13 can be dispensed with to make the keyboard thinner to meet thin and lean design requirement. FIGS. 5, 6 and 7 illustrate fifth, sixth and seventh embodiments. In these three embodiments the keyboard portion 10 has a moving mechanism 14 to bridge the baseboard 11 and keycaps 15. The moving mechanism 14 includes a movable member 141 bridging the holding board 13 and keycap 15, and an elastic element 142 supporting the keycap 15 to provide a return force for the keycap 15. There are some differences among them. In FIG. 5, the mask 21 is located on the circuit board 12 and the permeable zone 211 is located below the keycap 15 so that light emitted from the light source 22 passes through the permeable zone 211 outwards through the keycap 15. In FIG. 6, the mask 21 is located between the circuit board 12 and the baseboard 11. In FIG. 7, the mask 21 is located below the baseboard 11, and the permeable zone 211 is located below the gap 16 of the keycaps 15 so that light emitted from the light source 22 is transmitted below the mask 21 and projects through the permeable zone 211 to the gap 16 for lighting.

As a conclusion, the present invention mainly provides a mask 21 below the keycap 15 that has a light permeable zone 211 and an impermeable zone 212, and at least one light source 22 located beneath a lower surface of the mask 21 so that light emitted from the light source 22 can transmit below the mask 21 and project upwards through the permeable zone 211 outside the keyboard portion 10 to form local lighting of the keyboard portion 10. Thereby the location of each keycap 15 can be distinguished easier to improve usability and keystroke accuracy.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A local lighting keyboard, comprising:
    a keyboard portion which includes a baseboard, a plurality of keycaps movable up and down against the baseboard and a circuit board located between the baseboard and the keycaps, the circuit board being depressible by the keycaps during the up and down movement thereof to output corresponding signals; and
    a luminous portion which includes a mask located beneath the keycaps, the mask containing a light permeable zone, an impermeable zone and at least one light source located beneath a lower surface of the mask, the light source generating light which is transmitted below the mask and passes through the permeable zone to project upwards outside the keyboard portion;
    wherein the keyboard portion includes a holding board between the keycaps and the circuit board and a moving mechanism bridging the holding board and the keycaps;
    wherein the mask is located between the holding board and the keycaps, and the holding board contains a holding cavity to hold the light source.

2. The local lighting keyboard of claim 1, wherein the moving mechanism includes a movable member bridging the holding board and the keycaps and an elastic element supporting the keycaps to provide a return force for the keycaps.

3. The local lighting keyboard of claim 1, wherein the light source is a light emitting diode.

4. The local lighting keyboard of claim 1, wherein the light permeable zone is an opening.

5. The lighting keyboard of claim 1, wherein the light permeable zone is a light conductive material.

6. The lighting keyboard of claim 1, wherein the light permeable zone is selectively located below the keycaps or a gap formed between the keycaps.

* * * * *